US008628068B2

(12) United States Patent
Graffin

(10) Patent No.: US 8,628,068 B2
(45) Date of Patent: Jan. 14, 2014

(54) RETRACTABLE DEVICE FOR HOLDING CONTAINERS, AND A CONTAINER-PROCESSOR INSTALLATION FITTED WITH SUCH DEVICES

(75) Inventor: André Jean-Jacques Graffin, Winfield, IL (US)

(73) Assignee: SERAC Group, La Ferte Bernard (FR)

( * ) Notice: Subject to any disclaimer, the term of this patent is extended or adjusted under 35 U.S.C. 154(b) by 1054 days.

(21) Appl. No.: 12/559,058

(22) Filed: Sep. 14, 2009

(65) Prior Publication Data

US 2010/0065152 A1 Mar. 18, 2010

(30) Foreign Application Priority Data

Sep. 15, 2008 (FR) ...................................... 08 05032

(51) Int. Cl.
*B25B 5/04* (2006.01)
*B65G 47/86* (2006.01)

(52) U.S. Cl.
USPC ........................... 269/37; 269/303; 198/470.1

(58) Field of Classification Search
USPC ............. 269/37, 228, 254 R, 6, 10, 315, 303; 81/3.32; 198/470.1; 296/56, 39.1, 50
IPC ........................................................ B65B 43/60
See application file for complete search history.

(56) References Cited

U.S. PATENT DOCUMENTS

| | | | | |
|---|---|---|---|---|
| 1,856,827 | A | 5/1932 | Carruthers | |
| 3,309,838 | A | 3/1967 | Wilhere | |
| 7,073,837 | B2 * | 7/2006 | Madlinger | 296/57.1 |

FOREIGN PATENT DOCUMENTS

| | | | |
|---|---|---|---|
| EP | 1 659 088 | A | 5/2006 |
| GB | 426 084 | A | 3/1935 |

* cited by examiner

*Primary Examiner* — Lee D Wilson
*Assistant Examiner* — Jamal Daniel
(74) *Attorney, Agent, or Firm* — Muncy, Geissler, Olds & Lowe, PLLC

(57) ABSTRACT

A device for holding a bottom portion of a container in a container-processor installation, the device comprising a support core provided with a stationary abutment for a lateral surface of the bottom portion of a container, and with a shoe mounted to pivot about a substantially horizontal axis between a holding position in which the shoe extends in the vicinity of the abutment to co-operate with the bottom portion of the container, and a disengaged position in which the shoe is retracted to allow the bottom portion of a container to be inserted in the device and to be extracted from the device along a direction that is substantially coplanar with a direction in which the bottom portion of the container bears against the abutment. An installation including such a device.

15 Claims, 2 Drawing Sheets

RETRACTABLE DEVICE FOR HOLDING CONTAINERS, AND A CONTAINER-PROCESSOR INSTALLATION FITTED WITH SUCH DEVICES

FIELD OF THE INVENTION

The present invention relates to a container-holder device and to a container-processor installation such as an installation for conveying, filling, or closing said containers.

BACKGROUND OF THE INVENTION

As an example of such installations, container-closure installations are known that comprise a rotary platform with a periphery fitted with spindles for screwing on stoppers and with means for supporting containers under the screw-fastening spindles. A container feed star and a star for removing closed containers are provided adjacent to the platform, both stars being rotary and fitted at their peripheries with container-support means.

In general, a liquid-packaging production line has a plurality of installations disposed one after another and comprising in particular a filler installation, a closure installation, and possibly an installation for washing or rinsing containers, an installation for sterilizing them, . . . .

The rates of throughout of such installations give rise to relatively high container travel speeds. It is therefore necessary to hold containers to the stars and the platforms sufficiently securely to ensure that containers do not fall off.

In addition, certain operations, such as closing by screwing on a stopper, cannot be performed without the containers being prevented from turning about the screw-fastening axis. With containers made of plastics material, it is possible to prevent such containers from turning by means of sharp blades or spikes that bite into the material of the container, in particular beneath the collars of containers when the containers are supported by their collars. It is then necessary to exert a vertical force on the stoppers while they are being screwed on so as to enable the blades or spikes to penetrate into the collars. This force gives rise to an interfering opposing torque that makes it difficult to obtain a predetermined level of tightening torque for the stoppers. Furthermore, prior to the blades or spikes achieving penetration, the containers tend to turn so that the collars of the containers tend to rub against the blades or spikes, which then detach shavings that become dispersed within the installation. Neck-retaining devices might be devised for preventing such rotation.

Nevertheless, holding the containers firmly must not impede transferring the containers between the stars and the platforms. Such transfers of containers from one apparatus to another constitute operations that are critical during which the movement of the containers, and they need to be opposed as little as possible so as to avoid any containers being poorly positioned on said apparatuses.

OBJECT AND SUMMARY OF THE INVENTION

An object of the invention is to provide holder means that satisfy the above-specified constraints.

To this end, the invention provides a device for holding a bottom portion of a container in a container-processor installation, the device comprising a support core provided with a stationary abutment for a lateral surface of the bottom portion of a container, and with a shoe mounted to pivot about a substantially horizontal axis between a holding position in which the shoe extends in the vicinity of the abutment to co-operate with the bottom portion of the container, and a disengaged position in which the shoe is retracted to allow the bottom portion of a container to be inserted in the device and to be extracted from the device along a direction that is substantially coplanar with a direction in which the bottom portion of the container bears against the abutment.

Thus, the shoe can be retracted in order to enable containers to be transferred between the platform on which the device is installed and the transport apparatuses that insert containers in the platform and that remove them therefrom. In addition, the device that holds the bottom portions of the containers does not interfere with the top portions thereof and does not hinder performance of the processing operations that, in the context of packaging fluids, mostly require access to the openings of containers.

Advantageously, the shoe includes a thrust surface that, when the shoe is in the holding position, extends facing the abutment in such a manner that the thrust surface presses the bottom portion of the container against the abutment.

The bottom portion of a container can thus be clamped between the stationary abutment and the thrust surface of the movable shoe.

Under such circumstances, and preferably, the abutment and the thrust surface are shaped to fit closely around at least a fraction of the bottom portion of the container when the shoe is in the holding position.

The areas of contact between the container and both the stationary abutment and the thrust surface can thus be relatively large, thereby holding the container effectively, in particular preventing it from turning about its central axis. In addition, if the container is of polygonal cross-section, the bottom portion of the container is securely held in the housing defined by the stationary abutment and the movable shoe.

Also advantageously, when the shoe is in the holding position, the shoe includes a soleplate extending horizontally in the vicinity of the abutment so as to support the bottom of a container.

The bottom of the container then rests on the soleplate of the movable shoe, which soleplate is pressed against the bottom of the container when the shoe is in the holding position.

Advantageously, the pivot axis extends horizontally beneath the abutment and, preferably, the pivot axis of the shoe is spaced apart from the abutment This embodiment is particularly easy to construct and makes it simple to obtain a force pressing the shoes against the bottom portions of the containers.

Preferably, abutment and/or the shoe are coated in a material having a high coefficient of friction.

This further improves retention of the containers against rotation.

Advantageously, the device includes a resilient member returning the shoe to the holding position.

If the container is poorly positioned, the spring cannot return the shoe to its holding position, thereby limiting any risk of the container or the equipment being broken.

Under such circumstances, and preferably, the device includes a mechanical member for bringing the shoe into the disengaged position, which mechanical member advantageously comprises an arm projecting under the shoe and having a free end for co-operating with a cam that moves relative to said free end of the arm.

The invention also provides a processor installation incorporating the holder device of the invention.

Other characteristics and advantages of the invention appear on reading the following description of a particular non-limiting embodiment of the invention.

BRIEF DESCRIPTION OF THE DRAWINGS

Reference is made to the accompanying drawings, in which.

MORE DETAILED DESCRIPTION

Figure 1:
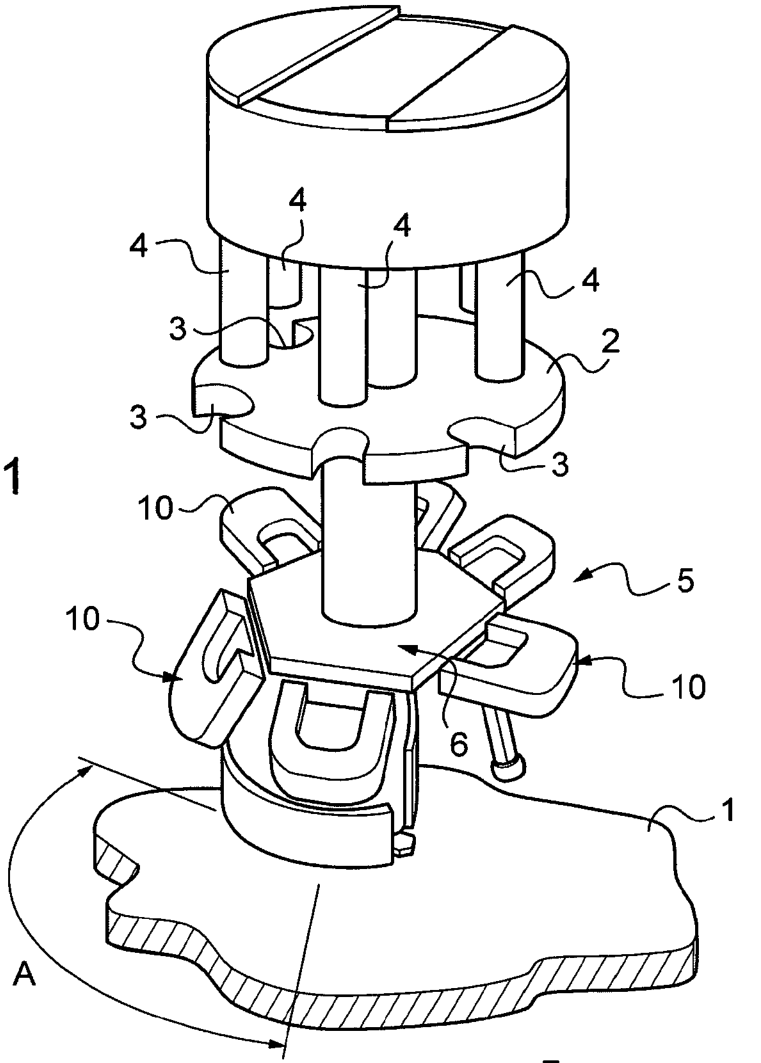
FIG. 1 is a fragmentary diagrammatic view in perspective of an installation in accordance with the invention.
Figure 2:
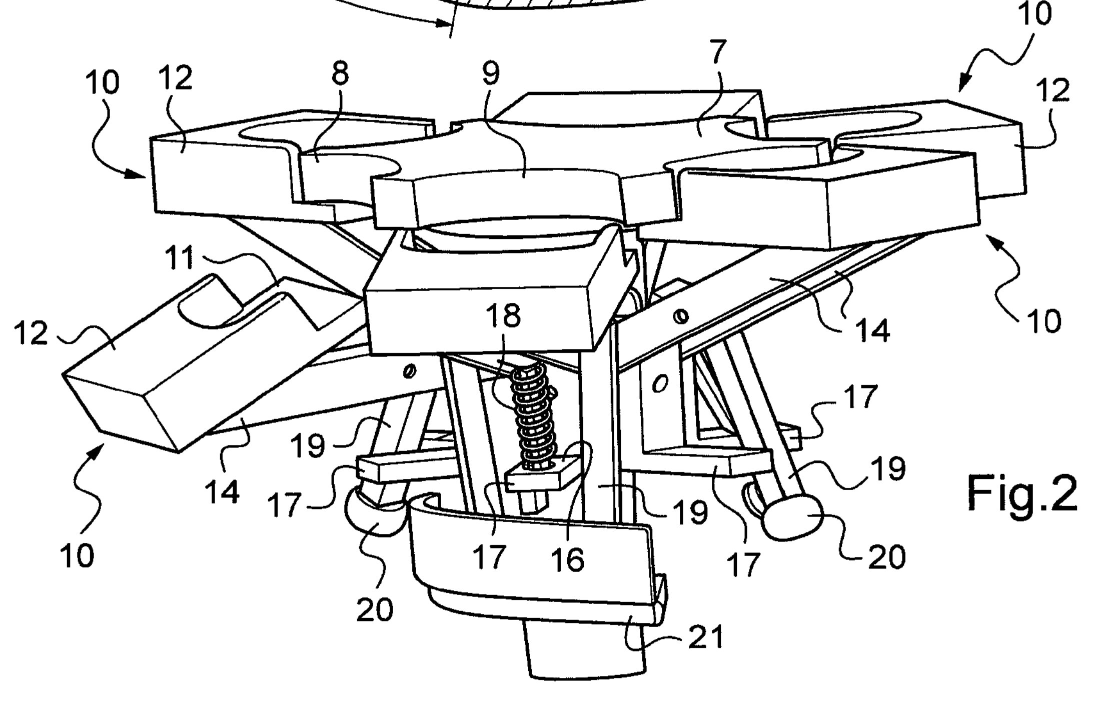
FIG. 2 is a more detailed perspective view of the holder device seen from a first viewing angle.

With reference to the figures, the invention is described below for a closure installation for closing containers that have a neck provided with a collar surmounted by an opening with a screw thread.

In conventional manner, the closure installation comprises a structure 1 having pivotally mounted thereon a column supporting a platform 2 with its periphery provided with means for supporting containers via their top portions, and more precisely in the example via their collars. In this example, these support means comprise recesses 3 that are arranged to receive the portion of the neck that extends immediately beneath the collar, and each of which is associated with a member for retaining the neck in the recess 3, which member is not shown but is itself known. The platform 2 is surmounted by a screw-driver turret from which there descend screw-driver spindles 4 disposed above respective recesses 3. The screw-driver spindles 4 are driven with vertical linear reciprocating motion by cams (not shown) secured to the structure 1. Each screw-driver spindle 4 has a bottom end that is provided with a gripper member for gripping a stopper and a top end that is driven in rotation. Stars or other container-transporter devices may be associated with the platform 2 in a zone A of the installation for delivering containers for closure to the recesses 3 and for extracting closed containers from the recesses 3. The various above-mentioned elements are themselves known and are not described in greater detail herein.

Beneath the platform 2, there is mounted a holder device 5 for holding the bottom portions of the containers.

The device 5 is secured to the column to move therewith in rotation and in translation. The holder device 5 comprises a core given overall reference 6, which core includes a horizontal top plate 7 with a periphery hollowed out by laterally-open recesses 8 for receiving corresponding portions of the bottom ends of containers. Each recess 8 extends beneath a respective recess 3 and is defined by a wall 9 forming a radial abutment for the bottom portion of a container.

The holder device 5 also has shoes given overall references 10, each comprising a soleplate 11 thrusting against the bottom of a container, and a jaw-forming portion 12 including a thrust surface 13 for pressing laterally against the bottom portion of a container.

Each shoe 10 is mounted on the core 6 so as to pivot between a holding position in which the shoe 10 extends in the vicinity of the wall 9 to co-operate with the bottom portion of a container, and a disengaged position in which the shoe 10 is retracted to enable the bottom portion of a container to be inserted into the device and to be extracted from the device along a direction that is substantially coplanar with a thrust direction (referenced F in FIG. 4) along which the bottom portion of the container presses against the wall 9.

Figure 3:
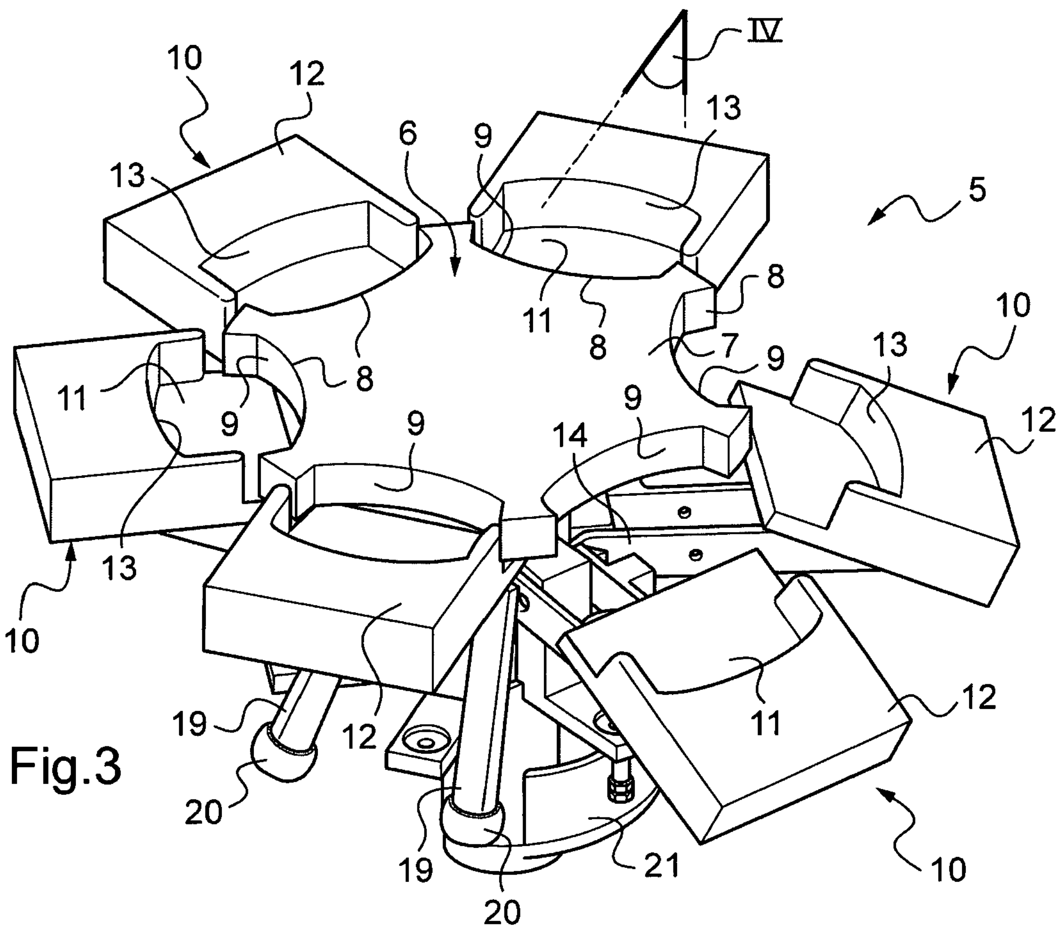
FIG. 3 is a view analogous to FIG. 2, but seen from a second viewing angle.

Each shoe 10 includes a pair of legs 14, each having one end rigidly fastened to the bottom face of the jaw 12 and an opposite end connected to the core 6 via a hinge pin 15 that extends horizontally beneath the plate 7 (and thus beneath the wall 9) in a position that is offset therefrom. A rod 16 (not shown in FIGS. 1 and 3) is mounted between the legs 14 and a bottom portion of the core 6 that forms a bracket 17. The rod 16 has a shouldered top end that is hinged to the leg 14 so as to pivot about an axis parallel to the hinge pin 15, and a bottom end that is received in the bracket 17 to slide and to pivot about an axis parallel to the hinge pin 15. A spring 18 is mounted around the rod 16 between the shouldered end thereof and the portion forming the bracket 17, so as to urge the shoe 10 resiliently towards its holding position. For reasons of clarity, the figures do not show all of the rods 16 and the springs 18.

Each shoe 10 is associated with a control arm 19 having one end rigidly fastened to one of the legs 14 and an opposite end provided with a wheel 20 for co-operating with a cam 21 that is fastened to the structure 1 facing the zone A so as to bring the shoe 10 into the disengaged position. The control arm 19 and the cam 21 form mechanical means for bringing the shoe into the disengaged position.

The wall 9 and the shoes 10 are coated in a material having a high coefficient of friction.

Figure 4:
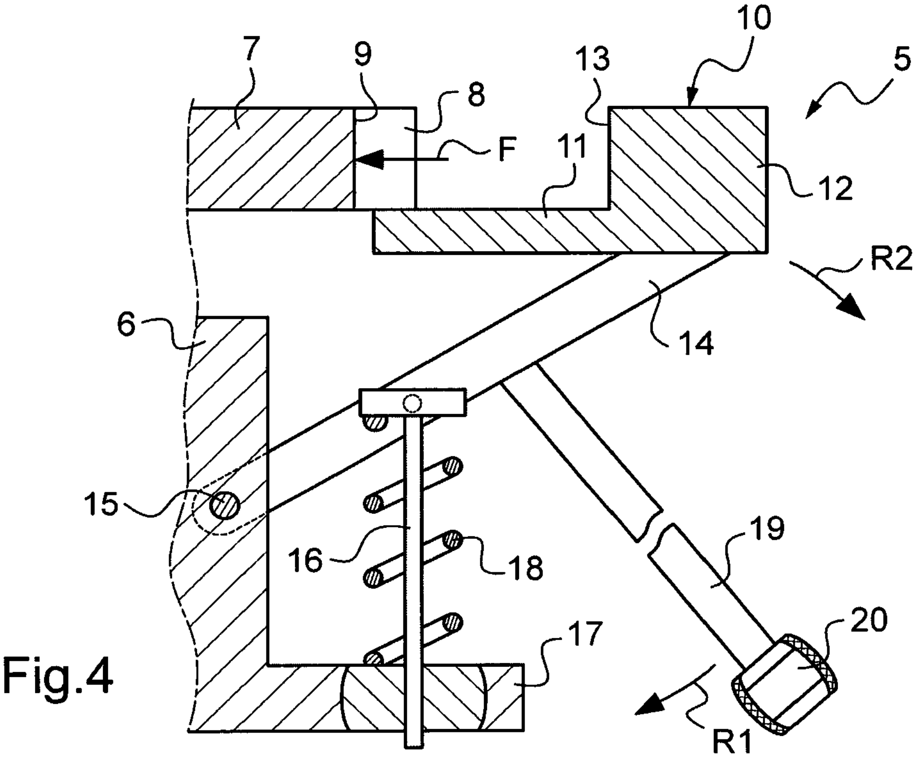
FIG. 4 is a diagrammatic view of the device in section on plane IV of FIG. 3.

A container is inserted into a recess 3 in the zone A while the corresponding shoe 10 is held in the disengaged position by the cam 21 lowering the control arm 19 (arrows R1 and R2 in FIG. 4). In the disengaged position, the shoe 10 leaves completely unobstructed the path for the bottom portion of a container both while the container is being inserted and while it is being removed. Since the platform 2 and the device 5 turn together, the wheel 20 leaves the cam 21, and the spring 18 returns the shoe 10 to the holding position. The thrust surface 13 then causes the bottom portion of the container to be pressed against the wall 9, and the soleplate 11 is pressed against the bottom of the container. In the figures it can be seen that the wall 9 and the thrust surface 13 are shaped to match the shape of the bottom portion of the container that is engaged in the housing defined by the wall 9 and the thrust surface 13.

While the stopper is being screwed on, the container is thus firmly held by the device 5 that prevents said container from turning about the screw-fastening axis of the stopper.

At the end of screw-tightening, the container is once more in the zone A as a result of the platform 2 and the device 5 turning together, so the cam 21 causes the shoe 10 to take up its disengaged position to allow the closed container to be removed.

Naturally, the invention is not limited to the embodiment described, but covers any variant coming within the ambit of the invention as defined by the claims.

In particular, the shoe may be of a shape different from that described and it need not have a soleplate or a thrust surface.

The thrust surface and the abutment may be of a shape that is adapted to define a housing having the same section as the containers, providing thrust zones that occupy points or areas.

A device for adjusting the height of the holder device may be provided in order to modify the distance between the holder device 5 and the platform 2, thus enabling the device to be adapted to containers of different heights.

The material having a high coefficient of friction need cover only a fraction of the shoe and/or of the stationary abutment, or it may indeed be omitted.

Other means for moving the shoes between their positions could be used, such as means that are mechanical, resilient, electrical, pneumatic, hydraulic, . . . .

Containers may be inserted or removed by an operator and/or in zones that are different.

The invention is applicable to installations in which containers are caused to move linearly.

Holding the bottom portion of a container firmly is also of interest in installations of other types. The invention applies likewise to any type of container-processor installation, and in particular to an installation for filling, conveying, washing, sterilizing, . . . containers.

What is claimed is:

1. A device for holding a bottom portion of a container in a container-processor installation, the device comprising a support core provided with a stationary abutment for a lateral surface of the bottom portion of a container, and with a shoe mounted to pivot about a substantially horizontal axis between an holding position and a disengaged position, the shoe including a soleplate, wherein, in the holding position, the soleplate extends horizontally in the vicinity of the abutment so as to support the bottom of a container, and wherein, in the disengaged position, the shoe is retracted to allow the bottom portion of a container to be inserted in the device and to be extracted from the device along a direction that is substantially coplanar with a direction in which the bottom portion of the container bears against the abutment.

2. A device according to claim 1, wherein the shoe includes a thrust surface that, when the shoe is in the holding position, extends facing the abutment in such a manner that the thrust surface presses the bottom portion of the container against the abutment.

3. A device according to claim 2, wherein the abutment and the thrust surface are shaped to fit closely around at least a fraction of the bottom portion of the container when the shoe is in the holding position.

4. A device according to claim 1, wherein the substantially horizontal pivot axis extends horizontally beneath the abutment.

5. A device according to claim 4, wherein the pivot axis of the shoe is spaced apart from the abutment.

6. A device according to claim 1, wherein the abutment and/or the shoe are coated in a material having a high coefficient of friction.

7. A device according to claim 1, including a resilient member returning the shoe to the holding position.

8. A device according to claim 1, including a mechanical member for bringing the shoe into the disengaged position.

9. A device for holding a bottom portion of a container in a container-processor installation, the device comprising a support core provided with a stationary abutment for a lateral surface of the bottom portion of a container, and with a shoe mounted to pivot about a substantially horizontal axis between a holding position in which the shoe extends in the vicinity of the abutment to co-operate with the bottom portion of the container, and a disengaged position in which the shoe is retracted to allow the bottom portion of a container to be inserted in the device and to be extracted from the device along a direction that is substantially coplanar with a direction in which the bottom portion of the container bears against the abutment, wherein the device includes a mechanical member for bringing the shoe into the disengaged position, the mechanical member comprising an arm projecting beneath the shoe and having a free end for co-operating with a cam that moves relative to said end of the arm.

10. A device according to claim 9, wherein the shoe includes a thrust surface that, when the shoe is in the holding position, extends facing the abutment in such a manner that the thrust surface presses the bottom portion of the container against the abutment.

11. A device according to claim 10, wherein the abutment and the thrust surface are shaped to fit closely around at least a fraction of the bottom portion of the container when the shoe is in the holding position.

12. A device according to claim 9, wherein the substantially horizontal pivot axis extends horizontally beneath the abutment.

13. A device according to claim 12, wherein the pivot axis of the shoe is spaced apart from the abutment.

14. A device according to claim 9, wherein the abutment and/or the shoe are coated in a material having a high coefficient of friction.

15. A device according to claim 9, including a resilient member returning the shoe to the holding position.

* * * * *